(12) United States Patent
Iyer (10) Patent No.: US 9,875,458 B2
(45) Date of Patent: Jan. 23, 2018

(54) TRACKING OF BUILT COMPONENTS BY USING ID TAGS (71) Applicant: Trimble Inc., Sunnyvale, CA (US)

(72) Inventor: Prakash Iyer, San Jose, CA (US)

(73) Assignee: Trimble Inc., Sunnyvale, CA (US)

( * ) Notice: Subject to any disclaimer, the term of this patent is extended or adjusted under 35 U.S.C. 154(b) by 493 days.

(21) Appl. No.: 14/583,604

(22) Filed: Dec. 27, 2014

(65) Prior Publication Data

US 2016/0189089 A1 Jun. 30, 2016

(51) Int. Cl.
G06Q 10/00 (2012.01)
G06Q 10/08 (2012.01)
G06Q 50/08 (2012.01)
G06F 17/30 (2006.01)

(52) U.S. Cl.
CPC .......... *G06Q 10/087* (2013.01); *G06Q 50/08* (2013.01); *G06F 17/30725* (2013.01)

(58) Field of Classification Search
CPC ................. G06Q 10/087; G06F 17/30725
USPC ..................... 707/E17.096; 705/28
See application file for complete search history.

(56) References Cited

U.S. PATENT DOCUMENTS

| 7,720,703 | B1 * | 5/2010 | Broughton | ............. | G06Q 10/06 705/7.23 |
| 8,212,677 | B2 | 7/2012 | Ferguson | | |
| 8,552,868 | B1 | 10/2013 | Ferguson | | |
| 8,606,548 | B2 | 12/2013 | Webster et al. | | |
| 8,799,037 | B2 | 8/2014 | Stefik et al. | | |
| 2012/0303149 | A1 * | 11/2012 | Bollendorf | .......... | G06F 17/5004 700/97 |
| 2012/0310602 | A1 * | 12/2012 | Jacobi | ................ | G06F 17/5004 703/1 |
| 2013/0228620 | A1 * | 9/2013 | Ahern | .................. | G01C 15/002 235/439 |
| 2013/0237949 | A1 * | 9/2013 | Miller | ................... | A61M 5/162 604/500 |
| 2013/0314210 | A1 * | 11/2013 | Schoner | ............ | G06K 7/10366 340/8.1 |
| 2014/0143000 | A1 * | 5/2014 | Kay | ....................... | G06Q 10/06 705/7.14 |
| 2016/0117785 | A1 * | 4/2016 | Lerick | ................ | G06Q 10/1095 705/305 |

* cited by examiner

*Primary Examiner* — A Hunter Wilder (74) *Attorney, Agent, or Firm* — Kilpatrick Townsend & Stockton LLP (57) ABSTRACT An apparatus for tracking a plurality of built components is provided. The apparatus comprises a reading gate configured to identify at least one fabricated building component arrived at the point of entry of the building site by reading an ID tag of each fabricated building component arrived at the point of entry of the building site and by associating the ID tag with a number imprinted on each fabricated building component. The reading gate is configured to record the timing of arrival of the identified fabricated building component at the point of entry of the building site.

15 Claims, 3 Drawing Sheets

TRACKING OF BUILT COMPONENTS BY USING ID TAGS

TECHNICAL FIELD

The technology relates to the utilization of a number of near field communication technologies (for example, RFID, Blue Tooth, etc.), and more specifically, for using of a number of near field communication technologies for tracking of built components on a building site.

BACKGROUND

The existing process of construction of a building involves conversion with a high accuracy of a conceptual 3-D model of a building created by design firms to a structural Building Information Model (BIM) (3D, 4D, 5D, etc.) of the building, whereas the completed structural BIM (3D, 4D, 5D, etc.) model is given to fabricators. The fabricators fabricate the various components of the building based on this structural BIM (3D, 4D, 5D, etc.) model that go into erecting an actual structure. However, the progress of the built components or the exact timing of when the built components actually arrive at the building site and the verification of whether all the built components have actually arrived is not being tracked.

What is needed is to implement a tracking process that would allow an authorized personnel to track the fact of arrival of all built components at a building site and the exact timing of arrival of all built components at the building site to enable precise scheduling of erection of a building.

The tracking process will allow both the visually rendered and database stored conceptual 3D model to show the most current status of the fabrication, transportation and erection of the building components thereby providing a high degree of visibility of the construction supply chain to the various stake holders.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

An apparatus for tracking a plurality of built components is provided. The apparatus comprises: a reading gate configured to identify at least one fabricated building component arrived at a point of entry of a building site of a building by reading an ID tag of each fabricated building component arrived at the point of entry of the building site and by associating the ID tag with a number imprinted on each fabricated building component; the imprinted number configured to identify each fabricated component. The reading gate is configured to record the timing of arrival of the identified fabricated building component at the point of entry of the building site.

The apparatus for tracking a plurality of built components further comprises a real time local Building Management (BM) Tracking Database comprising a set of real time tracking data for each fabricated component; the real time tracking data comprising imprinted number configured to identify each fabricated component and the timing of arrival of each fabricated component at the building site.

The apparatus for tracking a plurality of built components further comprises a local Building Management (BM) Erection Database comprising a set of erection data; each erection data comprising an erection event whereas at least one identified fabricated component has been utilized in the erection process of the building and the timing of the erection event.

The apparatus for tracking a plurality of built components further comprises a local Building Management (BM) Final Database comprising a completely populated BM Erection Database; wherein the BM Erection Database is completely populated upon completion of the erection process at the building site.

DESCRIPTION OF THE DRAWINGS

The accompanying drawings, which are incorporated in and form a part of this specification, illustrate embodiments of the technology and, together with the description, serve to explain the principles below.

FIGS. (1A-1B) is a flow chart of a method for tracking a plurality of built components for the purposes of the present technology.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1A:
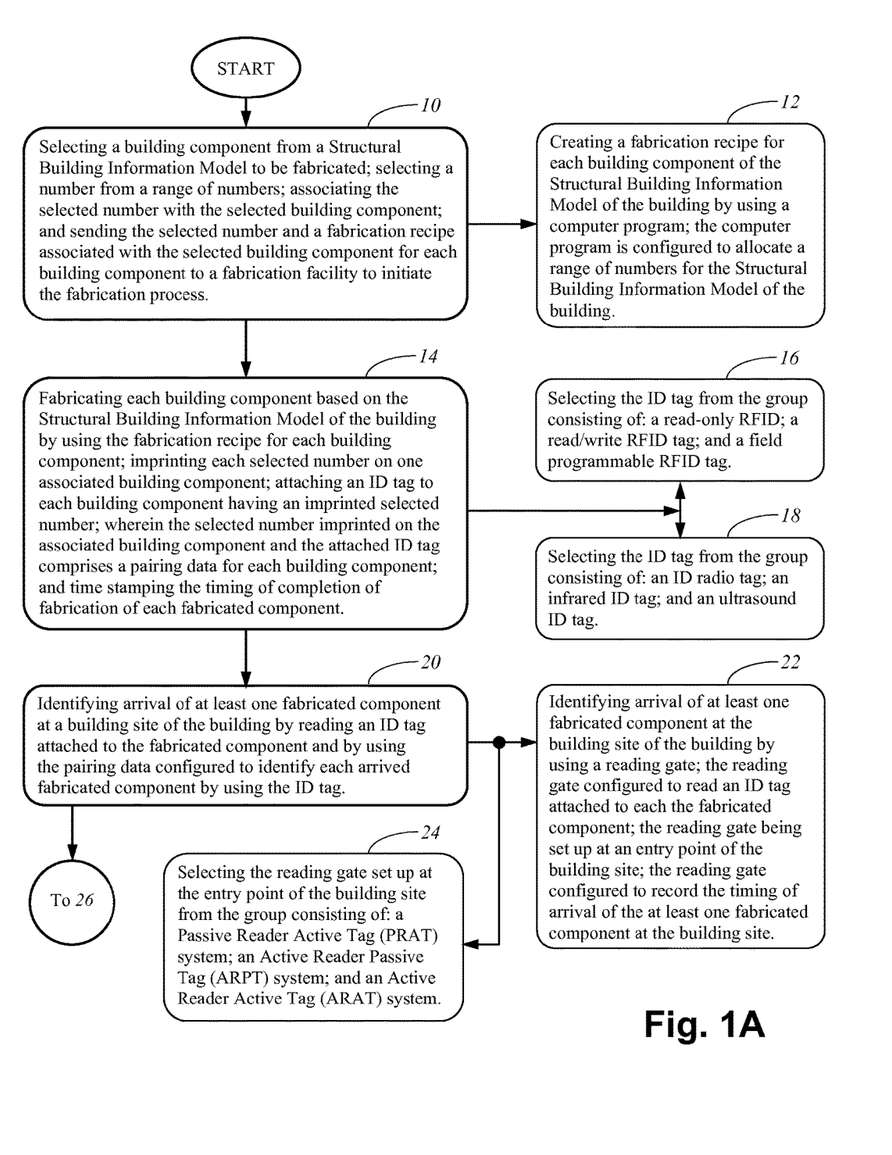
Figure 1B:
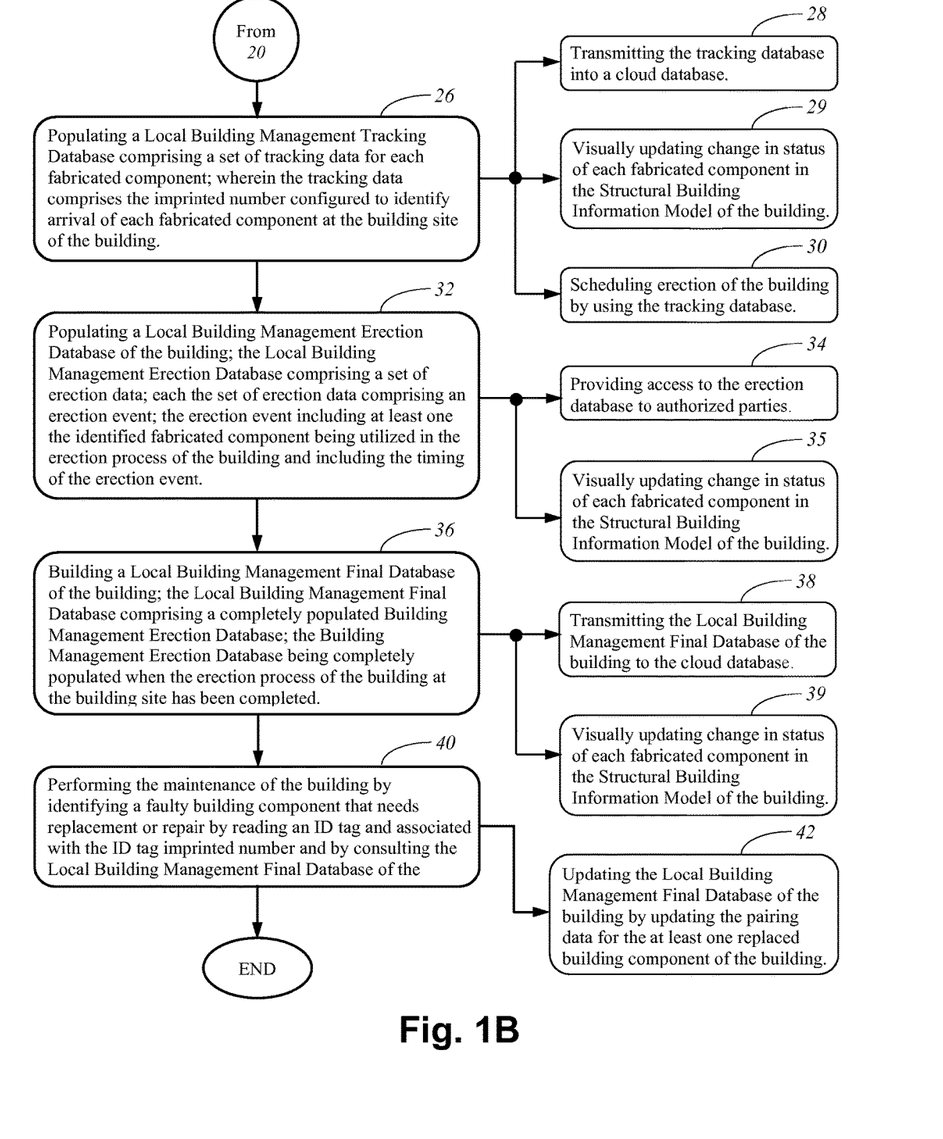

In an embodiment of the present technology, FIGS. (1A-1B) is a flow chart of a method for tracking a plurality of built components for the purposes of the present technology.

In an embodiment of the present technology, as shown in FIG. 1A, the step 10 comprises a number of the following sub-steps: selecting a building component from a structural BIM (3D, 4D, 5D, etc.) model to be fabricated (134 of FIG. 2); selecting a number from a range of numbers; associating the selected number with the selected building component; and sending the selected number and a fabrication recipe associated with the selected building component for each building component to a fabrication facility to initiate the fabrication process.

In an embodiment of the present technology, the step 10 including its sub-steps can be performed by using a Building Information Model (BIM) (3D, 4D, 5D, etc.) (134 of FIG. 2).

In 3D computer graphics, 3D modeling is the process of developing a mathematical representation of any three-dimensional surface of an object (either inanimate or living) via specialized software. The product is called a 3D model.

It can be displayed as a two-dimensional image through a process called 3D rendering or used in a computer simulation of physical phenomena. The model can also be physically created using 3D printing devices.

Models may be created automatically or manually. The manual modeling process of preparing geometric data for 3D computer graphics is similar to plastic arts such as sculpting.

3D modeling software is a class of 3D computer graphics software used to produce 3D models. Individual programs of this class are called modeling applications or modelers.

3D models represent a 3D object using a collection of points in 3D space, connected by various geometric entities such as triangles, lines, curved surfaces, etc. Being a collection of data (points and other information), 3D models can be created by hand, algorithmically (procedural modeling), or scanned.

3D models are widely used anywhere in 3D graphics. Actually, their use predates the widespread use of 3D graphics on personal computers. Many computer games used pre-rendered images of 3D models as sprites before computers could render them in real-time.

Today, 3D models are used in a wide variety of fields. The medical industry uses detailed models of organs; these may be created with multiple 2-D image slices from an MRI or CT scan. The movie industry uses them as characters and objects for animated and real-life motion pictures. The video game industry uses them as assets for computer and video games. The science sector uses them as highly detailed models of chemical compounds. The architecture industry uses them to demonstrate proposed buildings and landscapes through Software Architectural Models. The engineering community uses them as designs of new devices, vehicles and structures as well as a host of other uses. In recent decades the earth science community has started to construct 3D geological models as a standard practice. 3D models can also be the basis for physical devices that are built with 3D printers or CNC machines.

3D models represent a 3D object using a collection of points in 3D space, connected by various geometric entities such as triangles, lines, curved surfaces, etc. Being a collection of data (points and other information), 3D models can be created by hand, algorithmically (procedural modeling), or scanned.

The use of the term 4D is intended to refer to the fourth dimension: time, i.e. 4D is 3D plus schedule (time). The construction of the 4D models enables the various participants (from architects, designers, contractors to owners) of a construction project, to visualize the entire duration of a series of events and display the progress of construction activities through the lifetime of the project.

The use of the term 5D is intended to refer to the intelligent linking of individual 3D CAD components or assemblies with schedule (time constraint-fourth dimension), and then with cost-related information—the fifth dimension.

The use of the term 6D Building Information Modeling refers to the intelligent linking of individual 3D CAD components or assemblies with all aspects of project life-cycle management information.

A Building Information Management (BIM) software is used in the building and construction industries for steel and concrete detailing, precast and cast in-situ.

The BIM software enables users to create and manage structural BIM (3D, 4D, 5D, etc.) models in concrete or steel, and guides them through the process from concept to fabrication.

The process of shop drawing creation is automated. Along with the creation of Computer Numerically Control (CNC) files, BIM (3D, 4D, 5D, etc.) of structures includes files for controlling reinforcement bending machines, controlling precast concrete manufacturing, importing in PLM-systems, etc.

BIM (3D, 4D, 5D, etc.) models of structures are available in different configurations and localized environments to suit different segment- and culture-specific needs; version 19 was released in 2013.

DWG (from drawing) is a binary file format used for storing two- and three-dimensional design data and metadata. It is the native format for several CAD packages including DraftSight, AutoCAD, IntelliCAD (and its variants), Caddie and Open Design Alliance compliant applications. In addition, DWG is supported non-natively by many other CAD applications. The .bak (drawing backup), .dws (drawing standards), .dwt (drawing template) and .sv$ (temporary automatic save) files are also DWG files.

DGN (design) is the name used for CAD file formats supported by Bentley Systems' MicroStation and Intergraph's Interactive Graphics Design System (IGDS) CAD programs. There are two versions of DGN. Up until 2000, all DGN files were based on the Intergraph Standard File Formats (ISFF) specification, published in the late 1980s by Intergraph. This is sometimes referred to as V7 DGN, or Intergraph DGN.

In 2000, Bentley Systems created an updated version of DGN which includes a superset of DGN's capabilities, but which has a different internal data structure to the ISFF-based DGN. This version is properly referred to as V8 DGN.

The DGN format is used in many large projects, including buildings, highways, bridges, process plants, and shipbuilding. DGN is a competing format to Autodesk's DWG. In 2008 Autodesk and Bentley agreed on exchange of software libraries, including Autodesk RealDWG, to improve the ability to read and write the companies' respective DWG and DGN formats in mixed environments with greater fidelity. In addition, the two companies were to facilitate work process interoperability between their AEC applications through supporting the reciprocal use of available application programming interfaces (APIs).

The Industry Foundation Classes (IFC) data model is intended to describe building and construction industry data. It is a platform neutral, open file format specification that is not controlled by a single vendor or group of vendors. It is an object-based file format with a data model developed by building SMART (formerly the International Alliance for Interoperability, IAI) to facilitate interoperability in the architecture, engineering and construction (AEC) industry, and is a commonly used collaboration format in Building Information Modeling (BIM) based projects. The IFC model specification is open and available. It is registered by ISO and is an official International Standard ISO 16739:2013. Because of its focus on ease of interoperability between software platforms, the Danish government has made the use of IFC format(s) compulsory for publicly aided building projects. Also Finnish state owned Senate Properties demands use of IFC compatible software and BIM in all their projects.

A BIM software application for a BIM model-based construction project can import models from other BIM (3D, 4D, 5D, etc.) applications using the Industry Foundation Classes (IFC) format, also DWG and DGN.

Figure 2:
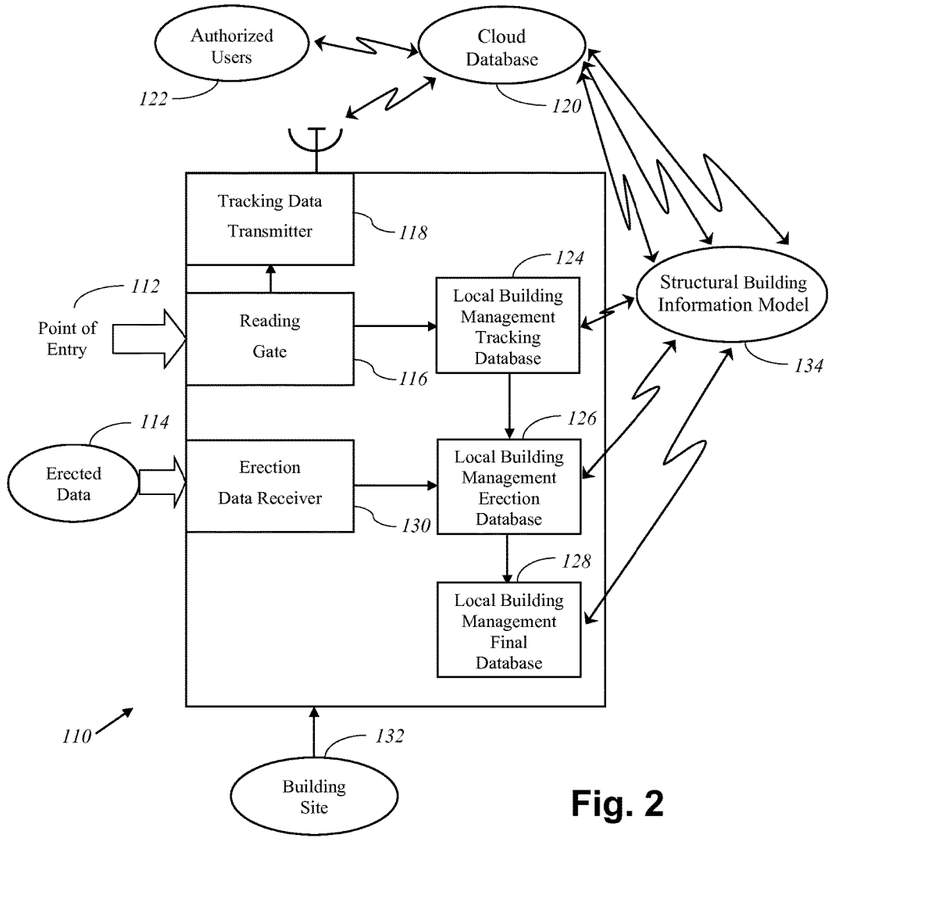
FIG. 2 illustrates a block diagram of an apparatus for tracking a plurality of built components for the purposes of the present technology.

In an embodiment of the present technology, referring to FIG. 1A, a Building Information Model computer program is used (step 12) to create a fabrication recipe for each building component of the structural BIM (3D, 4D, 5D, etc.) model of a building 124 (of FIG. 2).

In an embodiment of the present technology, a Building Information Model computer program is configured to allocate a range of numbers for the structural BIM (3D, 4D, 5D, etc.) model of a building (134 of FIG. 2).

In an embodiment of the present technology, fabricators with experience in fabricating specific components of a building to be constructed are selected.

In an embodiment of the present technology, referring still to FIG. 1A, a fabricator selected to fabricate a specific building component (based on the fabrication recipe disclosed in step 12), performs the step 14 comprising the following sub-steps: fabricating each building component based on the structural BIM (3D, 4D, 5D, etc.) model of the building 134 (of FIG. 2) by using the fabrication recipe for each building component; imprinting each selected number on one associated building component; attaching an ID tag to each building component having the imprinted selected number; and time stamping the timing of completion of fabrication of each fabricated component.

In an embodiment of the present technology, the selected number that imprinted on the associated building component and the attached ID tag comprise a pairing data for each building component.

In an embodiment of the present technology, the selected fabricator performs pairing of the imprinted number with the attached identification tag (ID tag) by using a Trimble phone/mobile device application configured to scan using the camera both the ID tag and the associated number provided by the structural BIM (3D, 4D, 5D, etc.) model of the building (134 of FIG. 2).

In an embodiment of the present technology, as shown in step 16 (of FIG. 1A), the ID tag (attached to each building component and used for pairing) is selected from the group consisting of a read-only RFID; a read/write RFID tag; and a field programmable RFID tag.

In an embodiment of the present technology, as shown in step 18 (of FIG. 1A), the ID tag (attached to each building component and used for pairing) is selected from the group consisting of an ID radio tag; an infrared ID tag; and an ultrasound ID tag.

In an embodiment of the present technology, the ID tag (not shown) can be implemented by using radio-frequency identification (RFID) technology that uses communication through the use of radio waves to exchange data with a reading device.

Radio-frequency identification involves the hardware known as interrogators (also known as readers), and tags (also known as labels), as well as RFID software or RFID middleware. The novel RFID tags are selected from the group consisting of: a High Frequency (HF) RFID tag, and an Ultra High Frequency (UHF) RFID tag.

RFID can be either passive (using no battery), active (with an on-board battery that always broadcasts or beacons its signal) or battery assisted passive "BAP" which has a small battery on board that is activated when in the presence of an RFID reader.

Passive RFID tags (those without a battery) do not require line of sight to "see" an RFID tag, the tag can be read inside a case, carton, box or other container, and unlike barcodes RFID tags can be read hundreds at a time. On the other hand, the bar codes can only read one at a time.

Most RFID tags contain at least two parts: one is an integrated circuit for storing and processing information, modulating and demodulating a radio-frequency (RF) signal, and other specialized functions (not shown); the other is an antenna (not shown) for receiving and transmitting the RF signal.

Some RFID tags can be read from several meters away and beyond the line of sight of an RFID reader. The application of bulk reading enables an almost simultaneous reading of tags by an RFID reader.

In an embodiment of the present technology, an ID tag attached to a building component (not shown) is implemented by using a combination of an RFID tag and an infra-red tag. The combination of active RFID tags and infrared technology enables the system to work in data environment where the short range of infrared signal is an advantage.

In an embodiment of the present technology, an ID tag attached to a building component (not shown) is implemented by using an ultra sound tag.

For example, the PC-Detector from Sonitor Technologies uses ultrasound indoor positioning and real time location systems (RTLS) technology to automatically track the real time location of items having an ultra sound tag attached. The RTLS solution makes the Sonitor ultrasound tag signal detectable by computers not already equipped with the hardware and sound processing capabilities. Sonitor Technologies Inc. is located in Largo, Fla.

In an embodiment of the present technology, an ID tag attached to a building component (not shown) includes an externally readable code selected from the group consisting of: a radio code transmitted on a specific frequency, a radio code transmitted on a specific frequency periodically, a radio code transmitted on a specific frequency aperiodically, an infrared code, an infrared code transmitted on a specific frequency periodically, an infrared code transmitted on a specific frequency aperiodically, an ultrasound transmitted on a specific frequency, an ultrasound transmitted on a specific frequency periodically, and an ultrasound transmitted on a specific frequency aperiodically.

In an embodiment of the present technology, an ID tag attached to a building component (not shown) is selected from the group consisting of: a read-only RFID having a factory-assigned serial number that is used as a key into a database; a read/write RFID tag, wherein an object-specific data can be written into the tag by the system user; a field programmable RFID tag comprising a write-once/read-multiple RFID tag; and "blank" RFID tag, wherein a tag may be written with an electronic product code by the user.

In an embodiment of the present technology, the apparatus 110 of FIG. 2 enables the tracking delivery of the built components at the building site.

In an embodiment of the present technology, the apparatus 110 of FIG. 2 for tracking the delivery of built components at the building site comprises a reading gate 116.

In an embodiment of the present technology, the reading gate 116 is configured to identify at least one fabricated building component arrived at the point of entry 112 of the building site 132 of a building by reading an ID tag (not shown) and by associating the ID tag with a number imprinted on the fabricated building component. The number imprinted on a building component is configured to identify the fabricated component.

In an embodiment of the present technology, the reading gate 116 is configured to record the timing of arrival of the identified fabricated building component at the point of entry 112 of the building site 132.

In an embodiment of the present technology, the reading gate 116 is selected from the group consisting of a Passive Reader Active Tag (PRAT) system; an Active Reader Passive Tag (ARPT) system; and an Active Reader Active Tag (ARAT) system.

RFID systems can be classified by the type of tag and reader. A Passive Reader Active Tag (PRAT) system has a passive reader which only receives radio signals from active tags (battery operated, transmit only). The reception range of a PRAT system reader can be adjusted from 1-2,000 feet (0.30-609.60 m), allowing flexibility in applications such as asset protection and supervision.

On the other hand, an Active Reader Passive Tag ARPT) system has an active reader, which transmits interrogator signals and also receives authentication replies from passive tags.

An Active Reader Active Tag (ARAT) system uses active tags awoken with an interrogator signal from the active reader. A variation of this system could also use a Battery-Assisted Passive (BAP) tag which acts like a passive tag but has a small battery to power the tag's return reporting signal.

In an embodiment of the present technology, the reading gate 116 is implemented by a fixed reader that creates a specific interrogation zone at the point of entry 112 which is tightly controlled. This allows a highly defined reading area for when tags go in and out of the interrogation zone.

In an embodiment of the present technology, the reading gate 16 is implemented by using an Infra Red (IR) tag reader (not shown). The Infra Red (IR) tag reader can be implemented by using tag return signal generation, and more specifically, by using a light source to return a signal from the IR tag to the tag reader 116. A modulated light signal could be produced by turning on and off a small infrared LED using short current pulses.

In an embodiment of the present technology, the Infra Red (IR) tag reader 116 is implemented by using a light shutter to modulate the light striking the IR tag reader 116. A corner cube reflector has the unique property that it will send light back to the source in a parallel path. Such reflectors are often used on street signs, bicycle reflectors and on reflective clothing.

If the ferroelectric device is turned on light would be allowed to pass through the device and would then bounce off the reflective material, sending the light back to the source. When the ferroelectric device is turned off, light would not reach the reflective material and would therefore be adsorbed. Some ferroelectric devices have been used for high speed video displays so they could allow high data rates. Texas Instruments also has perfected arrays of tiny mirrors that can be moved using electrostatic methods to produce a light modulator. The beauty of the optical reflective method is that the level of light reflected back to a reader would be proportional to the amount of light striking the OPID tag. The approach might allow the tag read range to be extended to hundreds of feet or perhaps even 1 miles.

In an embodiment of the present technology, the reading gate 116 is implemented by using an Ultra Sound tag reader (not shown). The Ultra Sound tag reader can be implemented by using Sonitor's ultrasound technology. Please, see discussion above.

In an embodiment of the present technology, the reading gate 116 further comprises a timing device (not shown).

In an embodiment of the present technology, the timing device (not shown) is synchronized by the externally broadcasted radio signals and is very precise.

In an embodiment of the present technology, the timing device (not shown) is configured to record the timing of arrival of a building component having an ID tag being checked in into the building site 32 through the reading gate 116.

In an embodiment of the present technology, the apparatus 110 of FIG. 2 for tracking the delivery of built components at the building site further comprises a real time local Building Management Tracking Database 124.

In an embodiment of the present technology, the real time local Building Management Tracking Database 124 (BM Tracking Database 124) further comprises a set of real time tracking data for each fabricated component that had arrived through the point of entry 112 into the construction and had been identified by the reading gate 116 utilized to read the ID tag attached to the fabricated component as has been disclosed above.

In an embodiment of the present technology, the real time local BM Tracking Database 124 further comprises a set of real time tracking data for each fabricated component (not shown) further comprising: (i) an imprinted number paired to the ID tag 116 (identified by the reading gate); and (ii) the timing of arrival of the identified fabricate component at the building site.

In an embodiment of the present technology, the real time local BM Tracking Database 124 is populated in real time by the reading gate 116 configured to transmit the set of real time tracking data for each fabricated component to the BM Tracking Database 124.

In an embodiment of the present technology, the real time local BM Tracking Database 124 is implemented by a memory block (not shown).

In an embodiment of the present technology, the reading gate 116 is configured to transmit the set of real time tracking data for each fabricated component to the BM Tracking Database 124 by using the tracking data transmitter 118 to the cloud database 120.

In an embodiment of the present technology, the reading gate 116 is configured to transmit the set of real time tracking data for each fabricated component to the BM Tracking Database 124 by the Internet connection (not shown) to the cloud database 120.

In an embodiment of the present technology, the structural BIM model of the building 134 is visually updated to include the change in status of each fabricated component arrived at the building site by receiving the tracking data from the cloud database 120.

In an embodiment of the present technology, the cloud database 120 is configured to provide access to at least one authorized user.

In an embodiment of the present technology, the cloud database including the real time BM Tracking Database 124 is made available for viewing to each authorized user having a valid updated password.

In an embodiment of the present technology, the apparatus 110 of FIG. 2 for tracking the delivery of built components at the building site further comprises a local Building Management Erection Database 126.

In an embodiment of the present technology, the local Building Management Erection Database 126 (BM Erection Database 126) comprises a set of erection data, wherein the erection data comprises an erection event whereas at least one identified fabricated component has been utilized in the erection process of the building and the timing of the erection event.

In an embodiment of the present technology, a construction worker utilizes a handheld device like a smart phone (not shown) to take a picture of an imprinted number for each fabricated component being used in the erection process of the building (an erection event) and to transit this number to the erection data receiver 130. This transmission automatically includes the timing of the erection event.

In an embodiment of the present technology, the erection data receiver 130 is configured to populate the local BM Erection Database 126 by transmitting the set of received erection data to the local BM Erection Database 126.

In an embodiment of the present technology, the real time local BM Erection Database 126 is implemented by a memory block (not shown).

In an embodiment of the present technology, the structural BIM model of the building 134 is visually updated to include the change in status of each fabricated component used in the erection of the building by receiving the erection data from the local BM Erection Database 126.

In an embodiment of the present technology, the apparatus 110 of FIG. 2 for tracking the delivery of built components at the building site further comprises a local Building Management Final Database 128 implemented by a memory block (not shown).

In an embodiment of the present technology, the local Building Management Final Database 128 (BM Final Database 128) comprises a completely populated local BM Erection Database 126 reflecting the completion of the erection process at the building site 132.

In an embodiment of the present technology, the local BM Final Database 128 of the completed building is transferred to the cloud database 120 (not shown).

In an embodiment of the present technology, the structural BIM model of the building 134 is visually updated by using the local BM Final Database 128 of the completed building.

In an embodiment of the present technology, the local BM Final Database 128 of the completed building can be used for the maintenance of the building.

In an embodiment of the present technology, more specifically, the maintenance of the completed building can be performing by identifying a faulty building component that needs replacement or repair at the building site, by reading the imprinted number of the faulty component, and by consulting the local BM Final Database 128 of the completed building to identify the replacement part that has to be fabricated again according to the original 3D conceptual model of the building.

In an embodiment of the present technology, the local BM Final Database of the building is updated after the replacement part had been manufactured to insert the new imprinted number of the replaced building component of the building into updated local BM Final Database 128 of the building.

Referring still to FIG. 1A, the method of the present technology further includes the step 20 of identifying arrival of at least one fabricated component at the building site 132 (of FIG. 2) of the building by reading an ID tag attached to the fabricated component and by using the pairing data configured to identify each arrived fabricated component by using the ID tag.

In an embodiment of the present technology, the step 20 is performed by using the apparatus 110 of FIG. 2. Please, see the description given above.

In an embodiment of the present technology, the step 22 (of FIG. 1A) is performed by identifying the arrival of at least one fabricated component at the building site 132 (of FIG. 2) of the building by using the reading gate 116 (of FIG. 2). The reading gate 116 is configured to read an ID tag attached to each fabricated component and is configured to record the timing of arrival of at least one fabricated component at the building site 132. Please see the description above.

In an embodiment of the present technology, the step 24 (of FIG. 1A) is performed by selecting the reading gate 116 set up at said entry point 112 of from the group consisting of: a Passive Reader Active Tag (PRAT) system; an Active Reader Passive Tag (ARPT) system; and an Active Reader Active Tag (ARAT) system. Please see the description above.

Referring to FIG. 1B, the method of the present technology further includes the step 26 of populating the local BM Tracking Database 124 (of FIG. 2) comprising a set of tracking data for each fabricated component. The tracking data comprises an imprinted number configured to identify arrival of each fabricated component at the building site 132 of the building. Please see the description above.

Referring to FIG. 1B, the method of the present technology further includes the step 28 of transmitting the BM Tracking Database 124 (of FIG. 2) into the cloud database 120 (of FIG. 2).

In an embodiment of the present technology, the step 28 of transmitting the BM Tracking Database 124 (of FIG. 2) into the cloud database 120 (of FIG. 2) is implemented by using the tracking data transmitter 118 (of FIG. 2).

Referring to FIG. 1B, the method of the present technology further includes the step 30 of scheduling erection of the building by using the BM Tracking Database 124 (of FIG. 2).

Referring to FIG. 1B, the method of the present technology further includes the step 29 of visually updating in the structural Building Information Model of the building 134 (of FIG. 2) change in status of each fabricated component arrived at the building site by using the BM Tracking database 124 (of FIG. 2).

Referring to FIG. 1B, the method of the present technology further includes the step 32 of populating a local BM Erection Database 126 (of FIG. 2) of the building. The local BM Erection Database 126 comprises a set of erection data. Each set of erection data comprises an erection event, wherein the erection event includes at least one identified fabricated component being utilized in the erection process of the building and including the timing of the erection event.

Referring to FIG. 1B, the method of the present technology further includes the step 34 of providing access to the BM Erection Database 126 to authorized parties.

The BM Erection Database 126 (of FIG. 2) provides metrics of the degree of the completion of the building and can be used to determine the next funding stage depending on the degree of the building completion achieved in the preceding funding stage.

In an embodiment of the present technology, the step 32 of populating the local BM Erection Database 126 (of FIG. 2) of the building is implemented by using the erection date receiver 130 (of FIG. 2) that is configured to receive the data from the building site when upon using at least one building component has been used in the erection of the building.

Referring to FIG. 1B, the method of the present technology further includes the step 35 of visually updating in the structural Building Information Model of the building 134 (of FIG. 2) change in status of each fabricated component being used in the erection process of the building by using the BM Erection Database 126 (of FIG. 2).

Referring to FIG. 1B, the method of the present technology further includes the step 36 of building a local BM Final Database 128 (of FIG. 2) of the building. The local BM Final Database 128 comprises a completely populated BM Erection Database 126, wherein the BM Erection Database 126 is completely populated when the erection process at the building site 132 has been completed.

Referring to FIG. 1B, the method of the present technology further includes the step 38 of transmitting the local BM Final Database 128 of the building to a cloud database (not shown).

Referring to FIG. 1B, the method of the present technology further includes the step 39 of visually updating in the structural Building Information Model of the building 134 (of FIG. 2) change in status of each fabricated component upon completion of the erection process of the building by using the BM Final Database 128 (of FIG. 2).

Referring to FIG. 1B, the method of the present technology further includes the step 40 of performing the maintenance of the building by identifying a faulty building component that needs replacement or repair by reading an ID tag and associated with said ID tag imprinted number and by consulting the local BM Final Database 128 of building.

Referring to FIG. 1B, the method of the present technology further includes the step 42 of updating the local BM Final Database 128 of the building by updating the pairing data for at least one replaced building component of the building.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method of tracking built components of a building comprising:
   (A) selecting a building component from a structural Building Information Model to be fabricated; selecting a number from a range of numbers; associating the number selected from the range of numbers with the building component selected from the structural Building Information Model; and sending the number and a fabrication recipe to a fabrication facility to initiate a fabrication process;
   (B) fabricating the building component based on the structural Building Information Model of the building by using the fabrication recipe associated with the building component; imprinting the number on the building component; attaching an ID tag to the building component, wherein the number imprinted on the building component and the ID tag attached to the building component are paired by pairing data; and time stamping a timing of completion of fabrication of the building component;
   (C) identifying arrival of the building component at a building site of the building by reading the ID tag attached to the building component and by using the pairing data configured to identify arrival of the building component by using the ID tag attached to the building component;
   (C1) identifying arrival of the building component at the building site by using a reading gate; the reading gate configured to read the ID tag attached to the building component; the reading gate being set up at an entry point of the building site; and the reading gate configured to record a timing of arrival of the building component at the building site;
   (D) populating a local Building Management Tracking Database comprising tracking data for the building component; the tracking data configured to identify arrival of the building component at the building site; and
   (E) scheduling erection of the building based on recording the timing of arrival of the building component at the reading gate using the tracking data of the building component.

2. The method of claim 1 further comprising:
   (G) populating a local Building Management Erection Database of said building; said local Building Management Erection Database comprising a set of erection data; each said set of erection data comprising an erection event; said erection event including at least one fabricated building component being utilized in an erection process of said building and including a timing of said erection event.

3. The method of claim 1 further comprising:
   (H) building a local Building Management Final Database of said building; said local Building Management Final Database comprising a completely populated local Building Management Erection Database; wherein said Building Management Erection Database is completely populated upon completion of erection of said building at the building site.

4. The method of claim 3 further comprising:
   (I) performing maintenance of said building by identifying a faulty building component that needs replacement or repair by reading an ID tag associated with the faulty building component and by consulting said local Building Management Final Database of said building.

5. The method of claim 1, wherein said step (A) further comprises:
(A1) creating a fabrication recipe for the building component of said structural Building Information Model of the building by using a computer program; said computer program is configured to allocate a range of numbers for said structural Building Information Model of said building.

6. The method of claim 1, wherein said step (B) further comprises:
(B1) selecting said ID tag from the group consisting of: a read-only RFID; a read/write RFID tag; and a field programmable RFID tag.

7. The method of claim 1, wherein said step (B) further comprises:
(B2) selecting said ID tag from the group consisting of: an ID radio tag; an infrared ID tag; and an ultrasound ID tag.

8. The method of claim 1 wherein said step (C1) further comprises:
(C1, 1) selecting said reading gate set up at said entry point of said building site from the group consisting of: a Passive Reader Active Tag (PRAT) system; an Active Reader Passive Tag (ARPT) system; and an Active Reader Active Tag (ARAT) system.

9. The method of claim 1, wherein said step (D) further comprises:
(D1) visually updating in the structural Building Information Model of the building a change in status of the building component arrived at the building site by using the local Building Management Tracking Database.

10. The method of claim 2, wherein said step (G) further comprises:
(G1) visually updating in the structural Building Information Model of the building a change in status of the building component being used in the erection of the building by using the local Building Management Erection Database.

11. The method of claim 2, wherein said step (G) further comprises:
(G2) providing access to the local Building Management Erection Database to authorized parties.

12. The method of claim 3, wherein said step (H) further comprises:
(H1) visually updating in the structural Building Information Model of the building a change in status of the building component upon completion of the erection of the building component by using said local Building Management Final Database.

13. The method of claim 3, wherein said step (H) further comprises:
(H2) transmitting said local Building Management Final Database of said building to a cloud database.

14. The method of claim 4, wherein said step (I) further comprises:
(I1) updating said local Building Management Final Database of said building by updating pairing data for at least one replaced building component of the building.

15. A system of tracking built components of a building comprising:
a reading gate;
a local Building Management Tracking Database; and
a processor under control of a non-transitory computer-readable medium and/or remote processing devices performing a method comprising:
selecting a building component from a structural Building Information Model to be fabricated; selecting a number from a range of numbers; associating the number selected from the range of numbers with the building component selected from the structural Building Information Model; and sending the number and a fabrication recipe to a fabrication facility to initiate a fabrication process;
fabricating the building component based on the structural Building Information Model of the building by using the fabrication recipe associated with the building component; imprinting the number on the building component; attaching an ID tag to the building component, wherein the number imprinted on the building component and the ID tag attached to the building component are paired by pairing data; and time stamping a timing of completion of fabrication of the building component;
identifying arrival of the building component at a building site of the building by reading the ID tag attached to the building component and by using the pairing data configured to identify arrival of the building component by using the ID tag attached to the building component;
identifying arrival of the building component at the building site by using the reading gate; the reading gate configured to read the ID tag attached to the building component; the reading gate being set up at an entry point of the building site; and the reading gate configured to record a timing of arrival of the building component at the building site;
populating the local Building Management Tracking Database comprising tracking data for the building component; the tracking data configured to identify arrival of the building component at the building site; and
scheduling erection of the building based on recording the timing of arrival of the building component at the reading gate using the tracking data of the building component.

* * * * *